United States Patent

Osada

Patent Number: 5,868,511
Date of Patent: Feb. 9, 1999

[54] NON-AQUEOUS INK FOR BALL POINT PEN AND BALL POINT PEN

[75] Inventor: Takahiro Osada, Gunma, Japan

[73] Assignee: Mitsubishi Pencil Kabushiki Kaisha, Tokyo, Japan

[21] Appl. No.: 527,573

[22] Filed: Sep. 13, 1995

[30] Foreign Application Priority Data

Sep. 16, 1994 [JP] Japan ................................. 6-222102
Aug. 8, 1995 [JP] Japan ................................. 7-202211

[51] Int. Cl.$^6$ .............................. B43K 7/00; B43K 7/08
[52] U.S. Cl. ................................... 401/209; 401/215
[58] Field of Search ................................... 401/215, 209

[56] References Cited

U.S. PATENT DOCUMENTS

| | | | |
|---|---|---|---|
| 2,979,030 | 4/1961 | Harrington | 401/215 M |
| 3,030,925 | 4/1962 | Dyson | 401/209 M |
| 3,166,050 | 1/1965 | Fehling et al. | 401/215 |
| 4,077,807 | 3/1978 | Kramer et al. | 106/24 |
| 4,091,129 | 5/1978 | Schaeuble | 427/428 |
| 4,218,251 | 8/1980 | Sanders | 106/30 |
| 4,492,968 | 1/1985 | Lee et al. | 346/140 R |
| 5,124,719 | 6/1992 | Matsuzaki | 346/1.1 |

FOREIGN PATENT DOCUMENTS

| | | | |
|---|---|---|---|
| 6239086 | 8/1994 | Japan | 401/209 |
| 738641 | 10/1955 | United Kingdom | 401/209 |
| 805362 | 12/1958 | United Kingdom | 401/215 |

*Primary Examiner*—Steven A. Bratile
*Attorney, Agent, or Firm*—Darby & Darby

[57] ABSTRACT

A pen which comprises a non-aqueous ink, the ink providing excellent cap-off performance in that the writing performance of the pen does not deteriorate even when the pen is allowed to stand exposed to air. The ink also provides a smooth feel when the pen is used for writing, and does not blob. This ink comprises an organic solvent having a vapor pressure of 0.2 mmHg (20° C.) or less, a colorant and a coagulant and has a non-Newtonian viscosity index of 0.2 to 0.5 and a viscosity of 200 mPa·s (25° C., 50 rpm) or less. Furthermore, the ink is characterized by containing a autolyophobic vehicle in which a contact angle to the surface of a material such as stainless steel or bronze having a high surface free energy is in the range of 5° to 40°.

6 Claims, 1 Drawing Sheet

NON-AQUEOUS INK FOR BALL POINT PEN AND BALL POINT PEN

BACKGROUND OF THE INVENTION (i) Field of the Invention

The present invention relates to an ink for a ball point pen and a type of a ball point pen which contains the ink in an ink tank or tube.

(ii) Description of the Related Art

Ball point pens typically comprise a pen point comprising a ball and a tip holder, an ink reserving tube, a penholder and the like. The ball of the pen point is rotated to transfer or sink an ink onto or into a recording medium such as a paper. In this way, written traces drawn lines can be made. During writing, excessive ink which has not been transferred or sunk to the recording medium adheres to the outer periphery of the tip holder, so that a blobbing phenomenon occurs where ink drops form at the start of writing or during writing, with the result that sharp lines sometimes cannot be drawn.

In order to solve this problem, for example, Japanese Patent Application Laid-open Sho No. 5-40192 has disclosed a method in which the outer periphery of the tip holder is coated with a water-repellent or an oil-repellent material so as to inhibit the ink from adhering to the outer periphery of the tip holder.

However, the coating material is peeled off by friction with a writing material such as paper during writing, resulting in the gradual onset of the blobbing phenomenon.

The principle by which the coating works is that the critical surface tension on the outer periphery of the tip holder is reduced so as to be lower than the surface tension of the ink, thereby decreasing the ability of the ink to wet the tip holder. However, since inks tend to have low surface tension, the surface of high-energy materials such as metal are disadvantageously wetted with ink. Because of this, it is easier to wet metal with a non-aqueous ink than an aqueous ink.

Even if the above-mentioned coating is applied to the surface of a low-energy material, there is only a slight difference between the critical surface tension of the outer periphery of the tip holder and the surface tension of the ink, and hence the oil-repellent effect of the coating is too poor to sufficiently prevent ink blobbing.

Furthermore, in the usual non-aqueous ink-containing ball point pen, the tip wear due to the rotation of the ball is relatively low, because the ink has a viscosity of thousands to millions of cps. However, if the viscosity of the ink is less than thousands of cps, lubrication of the ball by the ink does not occur, so that the tip becomes extremely worn, with the result that ink flow decreases and in some cases stops.

In a conventional non-aqueous ink-containing ball point pen, the ink contains a solvent having a low vapor pressure as a main component, and therefore, even if the cap is removed and the pen point is exposed to air, ink-flow decreases or cessation rarely occurs. However, since the non-aqueous ink has a high viscosity, of thousands to about one million mPa·s, a high writing pressure is required. Consequently, the fingers, arm and shoulder of a writer are easily tired by writing for a long period of time with a conventional non-aqueous ink-containing ball point pen. On the other hand, in an aqueous ink-containing ball point pen, the ink has a low viscosity, and therefore the writing feeling is light. However, the main solvent is water which easily vaporizes. Therefore, if the cap is removed and the pen point is exposed to air, decreases in or cessation of ink flow frequently occur.

Japanese Patent Application Laid-open Hei No. 1-299880 discloses a non-aqueous ink for a ball point pen in which the surface tension of the organic solvent is regulated and which has an ink viscosity of 50 to 2000 cP (25° C.) and possesses some of the characteristics of a non-aqueous ink and an aqueous ink, but this kind of ink is not always satisfactory. In recent years, some aqueous inks having an intermediate viscosity are on the market as inks having many advantageous features with respect to quality and economy, but these inks are inferior to non-aqueous inks, in cap-off performance, in that ink flow cessation rarely occurs with non-aqueous inks even when the cap is removed.

SUMMARY OF THE INVENTION

The present invention solves the above-mentioned problems. An object of the present invention is to provide a non-aqueous ink for a ball point pen simultaneously having features of a non-aqueous ink, i.e., excellent cap-off performance, in that writing performance does not noticeably deteriorate even when the cap is left off for an extended period of time, and the feature of an aqueous ink that writing can be done at a low writing pressure, without blobbing.

The following are seven preferred embodiments of the non-aqueous ink of the present invention:

(1) A non-aqueous ink for a ball point pen having a non-Newtonian viscosity index of 0.2 to 0.5 and a viscosity of 200 mPa·s (25° C., 50 rpm) or less which comprises an organic solvent having a vapor pressure of 0.2 mmHg (20° C.) or less, a colorant and a coagulant.

(2) A non-aqueous ink for a ball point pen having a non-Newtonian viscosity index of 0.2 to 0.5 and a viscosity of 200 mPa·s (25° C., 50 rmp) or less which comprises (a) an autolyophobic vehicle which comprises an organic solvent having a vapor pressure of 0.2 mmHg (20° C.) or less, a pigment dispersant and if necessary, an oleophobic additive; and in which a contact angle to the surface of a material such as stainless steel or bronze having a high surface free energy is in the range of 5° to 40°, (b) a coagulant and (c) a pigment.

(3) A non-aqueous ink for a ball point pen having a non-Newtonian viscosity index of 0.2 to 0.5 and a viscosity of 200 mPa·s (25° C., 50 rpm) or less which comprises (a') an autolyophobic vehicle which comprises an organic solvent having a vapor pressure of 0.2 mmHg (20° C.) or less, a dye and if necessary, an oleophobic additive; and in which a contact angle to the surface of a material such as stainless steel or bronze having a high surface free energy is in the range of 5° to 40°, and (b) a coagulant.

(4) A non-aqueous ink for as ball point pen which contains a vehicle having autolyophobic properties to the surface of a material having a high surface free energy.

(5) The non-aqueous ink for a ball point pen according to paragraph (4) which contains a solvent having autolyophobic properties.

(6) The non-aqueous ink for a ball point pen according to paragraph (4) which contains a solvent having no autolyophobic properties and an oleophobic additive.

(7) The non-aqueous ink for a ball point pen according to paragraph (4) which has a viscosity of 1000 mPa·s or less.

Preferred embodiments of the non-aqueous ball point pen of the present invention have the following compositions (8) to (12):

(8) A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa·s (25° C., 50 rpm) or less which comprises an organic solvent having a vapor pressure of 0.2 mmHg (20° C.) or less, a colorant and a coagulant.

(9) A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa·s (25° C., 50 rpm) or less which comprises (a) an autolyophobic vehicle which comprises an organic solvent having a vapor pressure of 0.2 mmHg (20° C.) or less, a pigment dispersant and if necessary, an oleophobic additive; and in which a contact angle to the surface of a material such as stainless steel or bronze having a high surface free energy is in the range of 5° to 40°, (b) a coagulant and (c) a pigment.

(10) A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa·s (25° C., 50 rpm) or less which comprises (a') an autolyophobic vehicle which comprises an organic solvent having a vapor pressure of 0.2 mmHg (20° C.) or less, a dye and if necessary, an oleophobic additive; and in which a contact angle to the surface of a material such as stainless steel or bronze having a high surface free energy is in the range of 5° to 40°, and (B) a coagulant.

(11) A non-aqueous ball point pen in which the outer surface of the ball point pen is made of a material having a surface free energy higher than an organic material such as a resin and which is equipped with an ink reserving tube filled with an ink having autolyophobic properties to the outer surface of the ball point pen.

(12) The non-aqueous ball point pen according to the paragraph (11) wherein the viscosity of the ink is 1000 cps or less.

Figure 1:
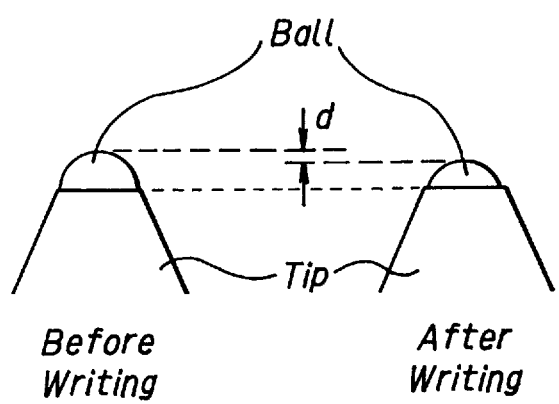
FIG. 1 is a view in which pen points of a ball point pen before and after writing are compared with each other.

The symbol "d" designates the difference between the lengths of projecting balls.

DETAILED DESCRIPTION OF PREFERRED EMBODIMENTS

An organic solvent for use in a non-aqueous ink for a ball point pen of the present invention has a vapor pressure of 0.2 mmHg (20° C.) or less. Typical examples of the organic solvent include benzyl alcohol (1 mmHg/58° C.), dipropylene glycol (0.01 mmHg or less/20° C., water-soluble), propylene glycol monophenyl ether (0.01 mmHg or less/20° C.), triethylene glycol monobutyl ether (0.01 mmHg or less/20° C.), tripropylene glycol monomethyl ether (0.03 mmHg/20° C.), octyl adipate (0.001 mmHg/85° C.), dibutyl sebacate (0.001 mmHg/71° C.), dioctyl sebacate (5 mmHg/240° C.), glycerin (0.0025 mmHg/50° C.), polypropylene glycol (molecular weight=400–700), glycerin derivatives (e.g., polyoxypropyltriol, Uniol TG-1000 and Union TG-2000 made by Nippon Oils & Fats Co., Ltd.), ethylene glycol monophenyl ether (0.03 mmHg/20° C.), ethylene glycol monobenzyl ether (0.02 mmHg/20° C.), ethylene glycol mono α-methylbenzyl ether (0.02 mmHg/20° C.), ethylene glycol mono-α,α'-dimethylbenzyl ether (0.02 mmHg/20° C.), a mixture of ethylene glycol monomethylphenyl ether isomers (0.02 mmHg/20° C.), a mixture of ethylene glycol monodimethylphenyl ether isomers (0.02 mmHg/20° C.), a mixture of ethylene glycol monoethylphenyl ether isomers (0.02 mmHg/20° C.), a mixture of ethylene glycol monomethylbenzyl ether isomers (0.02 mmHg/20° C.), a mixture of ethylene glycol monoethylbenzyl ether isomers (0.02 mmHg/20° C.), ethylene glycol monocyclohexyl ether (0.01 mmHg/20° C.), ethylene glycol monodihydro-α-tervinyl ether (0.02 mmHg/20° C.), propylene glycol monophenyl ether (0.03 mmHg/20° C.), propylene glycol monobenzyl ether (0.03 mmHg/20° C.), propylene glycol monocyclohexyl ether (0.04 mmHg/20° C.), propylene glycol monotervinyl ether (0.02 mmHg/20° C.), diethylene glycol monophenyl ether (0.02 mmH/20° C.), diethylene glycol monobenzylphenyl ether (0.02 mmHg/20° C.), diethylene glycol monoethylphenyl ether (0.02 mmHg or less/20° C.), ethylene glycol monoethylbenzyl ether (0.02 mmHg or less/20°), diethylene glycol monocyclohexyl ether (0.02 mmHg/20° C.), diethylene glycol monomethyl ether (0.18 mmHg/25° C.), diethylene glycol monodihydro-α-tervinyl ether (0.02 mmHg/20° C.), dipropylene glycol monophenyl ether (0.02 mmHg/20° C.), dipropylene glycol monobenzyl ether (0.02 mmHg/20° C.), dipropylene glycol monocyclohexyl ether (0.03 mmHg/20° C.), dipropylene glycol monotervinyl ether (0.02 mmHg/20° C.) and the like.

The amount of the solvent is in the range of 50 to 95% by weight based on the weight of the ink. If the amount is less than 50% by weight, the cap-off performance deteriorates.

An autolyophobic vehicle which can be used in the ink of the present invention is a vehicle (a) which comprises an organic solvent having a vapor pressure of 0.2 mmHg or less, a pigment dispersant and if necessary, an oleophobic additive and in which the contact angle of the vehicle to the surface of a material such as stainless steel or bronze having a high surface free energy is in the range of 5° to 40°, or a vehicle (a') which comprises an organic solvent having a vapor pressure of 0.2 mmHg or less, a dye and if necessary, an oleophobic additive and in which the contact angle of the vehicle to the surface of a material such as stainless steel or bronze having a high surface free energy is in the range of 5° to 40°. To this vehicle, a resin, an anticorrosive agent, a lubricating oil and the like can be added, as long as they do not impair the autolyophobic properties of the vehicle.

The autolyophobic vehicle can inhibit a tip holder from being wet by ink, such that the formation of ink drops which cause blobbing can be suppressed. That is to say, in order to prevent blobbing, the vehicle should possess a contact angle of about 180° in principle, but in fact, it preferably has as contact angle of 40° or less. This is because the organic solvent which can be used in the ink originally has a small surface tension $\gamma_L$ and hence a difference between this surface tension $\gamma_L$ and the critical surface tension $\gamma_c$ is slight, so that a large contact angle (θ) such as 180° mentioned above cannot be achieved, and a large value of the contact angle such as 180° is not preferable in view of the writing performance of the ink.

If the contact angle is 5° or less, blobbing will occur, irrespective of the viscosity of the ink which will be described hereinafter.

The autolyophobic vehicle is adsorbed on a solid-liquid interface when the molecules of the vehicle's components contact a high-energy surface, thereby lowering the critical surface tension of the solid, so that a low energy surface is created that prevents the molecules from spreading on the surface of the solid and thereby inhibits wetting. The autolyophobic solvent is a solvent in which the critical surface tension $\gamma_c$ of the adsorption film of the solvent molecules is smaller than the surface tension of the solvent, but even when the solvent itself has no autolyophobic properties, the lyophobic state can be obtained when the $\gamma_c$ of an adsorption monolayer of solute molecules dissolved in the solvent is smaller than the surface tension $\gamma_{1V}$ of the solvent. Such solute molecules are called oleophobic additives, and such an adsorption monolayer is called an oleophobioc monolayer. The means for exerting such autolyophobic properties is the use of an oleophobic solvent or a combination of a solvent having no oleophobic properties and an oleophobic additive, but if necessary, a resin, an anticorrosive agent, a lubricating oil and the like may be added, as long they do not destroy the autolyophobic properties. Furthermore, a surface active agent can also be added to regulate the surface tension and to control the autolyophobic properties of the vehicle.

Examples of a solvent having autolyophobic properties include 1-octanol, 2-octanol, benzyl alcohol, ethylene glycol monophenyl ether, diethylene glycol monomethyl ether and 2-ethyl-1-hexanol. It is also possible for the oleophobic additive to be added to the autolyophobic solvent to further increase the autolyophobic properties.

Examples of the oleophobic additive include perfluoroalkylphosphoric acid esters and alkylphosphoric acid esters. However, the effect of the oleophobic additive varies with interactions such as solubility in the solvent, and therefore the oleophobic additive should be selected in consideration of the kind of solvent. For example, when the solvent is polypropylene glycol (average molecular weight=400) or tripropylene glycol monobutyl ether, a perfluoroalkylphosphoric acid ester is preferable, and when the solvent is ethylene glycol monophenyl ether, an alkylphosphoric acid ester is effective as the oleophobic additive.

As the oleophobic additives, fluorocarbon and silicone oil are effective when the surface tension of the liquid is 24 dyne/cm or less, and fatty acids and other aliphatic polar compounds are effective when it is in excess of 24 dyne/cm. If the surface tension of the liquid is 30 to 32 dyne/cm, polar compounds which are derivatives of branched and cyclic hydrocarbons can be used. They can be controlled by the viscosity and the surface tension of the vehicle, if necessary.

As a colorant for use in the ink for the ball point pen of the present invention, dyes and pigments can be used which are typically employed in writing implements or inks for coating materials. The dye becomes one component of the vehicle, but the pigment does not become a component of the vehicle.

Basic dyes, acid dyes and direct cotton dyes which can be solubilized or microencapsulated can be employed. Examples of the dyes include Barifast Black #1802, Barifast Black #1805, Barifast Black #3820, Barifast Violet #1701, Barifast Yellow AUM and Barifast Yellow #3104 (made by Orient Chemical Industry Co., Ltd.), Spiron Violet C-RH, Spiron Black CMH Special, Spiron Yellow C-GNH, Spiron Orange GRH and Spiron Red BEH (made by HODOGAYA CHEMICAL CO., LTD.), Auramines, Rhodamines, Methyl Violets, Malachite Greens, Crystal Violets, Victoria Blues BOH and the like.

Inorganic pigment or an organic pigment can be used, and a processed pigment or a dispersed toner obtained by surface modification with a resin or a surface active agent may also be used. Examples of the pigments that can be employed in the invention include titanium oxide, carbon black, phthalocyanine compounds, azo compounds, anthraquinone compounds, quinacridone compounds, Microlease Color (made by Ciba-Geigy) and Fuji AS Color (made by Fuji Dyestuff Co., Ltd.). No particular restriction is put on the amount of the colorant, and this amount depends upon the solubility and the dispersion force of the colorant as well as a desired hue and density. The amount of the colorant is closely related to the starving phenomenon in which ink flow decreases and writing failure where ink flow stops. If the colorant is used in excessive amounts, ink flow decreases or cessation occurs even in the case of the ink composition of the present invention, and if the colorant is used in an insufficient amount, decreased ink flow and ink flow cessation can be avoided, but the color development of the lines drawn by the ball point pen is poor. In consequence, the amount of the colorant to be used is in the range of 0.5 to 50% by weight.

Examples of the pigment dispersant which is one of the vehicle components include typical resins and oligomers for pigment dispersion such as polyvinyl butyrals, polyvinyl pyrrolidones, polyacrylic acids, styrene-maleic acid resins and the like. Typical examples of the pigment dispersant include Solsperses made by ICI which are the resins and oligomers, and Eslec B BM-1 and Eslec B BL-1 made by Sekisui Chemical Co., Ltd. which are the polyvinyl butyrals. Moreover, an anionic, a nonionic or a cationic surface active agent may be added as a main component or an auxiliary component.

The amount of the pigment dispersant depends upon the kind of pigment and the color density of the ink, and it is in the range of 0.1 to 40% by weight based on the weight of the pigment and in the range of 0.05 to 20% by weight based on the total weight of the ink.

Examples of a coagulant which can be used in the present invention include inorganic compounds such as synthesized fine powder silica, bentonites, extremely fine precipitated calcium carbonate and the like; composite compounds such as a bentonite, having inorganic cations between crystal layers, treated with a cationic organic compound, an organic bentonite (a modified clay) obtained by the replacement of hydrate water, a surface-treated calcium carbonate and the like; organic compounds such as metallic soaps, hydrogenated castor oils, polyamide waxes, benzylidene sorbitols, amide waxes, microgels, polyethylene oxides, polymerized vegetable oils such as polymerized linseed oils and fatty acid dimers and the like; and surface active agents such as sulfuric esters (sulfated oils, higher alcohols and sulfates), nonionic surface active agents (fatty acid esters and polyethers) and the like. Typical trade names of the coagulants include organic bentonites such as Benton SD-2 and Benton 27 made by NL Chemicals Co., Ltd., TIXOGEL VZ and TIXOGEL EZ made by Nissan Gardler Catalyst Co., Ltd., EX-0101 made by SUD Chemicals, Inc., silica compounds such as Mizcasil P-801 made by Mizusawa Chemical Industry Co., Ltd., Aerosil 380 and Aerosil COK84 made by Nippon Aerosil Co., Ltd., polyamides of fatty acids such as Tarlene VA-100, VA-500 and VA-800 made by Koeisha Oil & Fat Chemicals, Inc., ASA T-1, T-51 and T-350F made by Ito Seiyu Co., Ltd. and the like. The content of the coagulant is in the range of 0.01 to 10% preferably 0.5 to 5%.

The ink of the present invention has a non-Newtonian viscosity index n of 0.2 to 0.5 (25° C.). The value of n can be defined by the following fluid equation $$S = \mu D^n$$

wherein S is a shearing stress, and D is a shear rate.

The non-Newtonian viscosity index n is preferably in the range of 0.2 to 0.4. If the index n is more than 0.5, a direct flow phenomenon occurs, and if it is less than 0.2, the writing performance of the ink is poor, so that ink flow is impeded and sometimes stops.

The viscosity of the ink according to the present invention is 100 mPa·s (25° C., 50 rpm) or less, preferably 200 mPa·s (25° C., 50 rpm) or less, more preferably 100 mPa·s (25° C., 50 rpm) or less, most preferably 50 mPa·s (25° C., 50 rpm) or less. The autolyophobic properties and the contact angle, which do not contain the factor of time, denote an equilibrium state. If the vehicle has autolyophobic properties, blobbing should be inhibited, but in fact, when the viscosity is high, a velocity at which a liquid drop is repelled is low, so that the effect of the autolyophobic properties decreases disadvantageously.

The generation of ink blobs is affected by both the autolyophobic properties (the contact angle) of the vehicle and the viscosity of the ink. Therefore, if the viscosity is 200 mPa·s or less and the contact angle is large, blobbing can be suppressed, but if the viscosity is more than 200 mPa·s and the contact angle is small, blobbing occurs.

The ball point pen of the present invention comprises a pen point comprising a ball and a tip holder, an ink reserving tube and a joint for joining the tip to the ink reserving tube, where the ink reserving tube is filled with the above-mentioned ink for the ball point pen of the present invention. As a material for the tip holder, there can be used a material having a surface energy higher than that of the solvent for use in the non-aqueous ink. Typical examples of such a material include metals such as stainless steel and nickel silver, and ceramics having practical strength.

In the non-aqueous ink of the present invention, blobbing does not occur when low writing pressure is applied and the pen tip shows little wear even after the pen is used extensively, with the result that ink flow decreases and interruptions do not occur, because the vehicle of the ink with which the ball point pen is filled has autolyophobic properties to the surface of the materials having a high energy (a metal such as stainless steel) used for the tip holder, and the viscosity of the ink is 1000 mPa·s or less, preferably 200 mPa·s or less.

In general, by lowering the viscosity of the ink, a light writing feeling can be realized, but if a non-aqueous ink is used and its viscosity is low, blobbing increases owing to the increase of the wetting rate and the decrease in the lubricating properties of the ink. When the viscosity of the ink is high, the tip wear is relatively low, but it increases with the deterioration of the viscosity. The ink viscosity of 200 mPa·s or less is in a boundary lubrication region, and in this region, extreme wear occurs. In the present invention, however, because of the autolyophobic properties of the ink, a non-aqueous ball point pen is provided in which the tip holder is scarcely wetted with ink during the rotation of the ball, so that blobbing decreases, and simultaneously, by virtue of the autolyophobic properties of the ink, liquid molecules or molecules of the oleophobic additive are adsorbed on the surface of a solid such as a metal, and the lubricating properties of the ink are improved due to the presence of the oriented molecules, and in consequence, the wear of the pen tip can be decreased, with the result that a smooth light writing feeling can be attained.

The viscosity of the ink has an influence on the wetting velocity, the lubricating properties and the writing feeling. The prevention of blobbing of the ink can be achieved by lowering the viscosity. The decrease of the viscosity from millions of mPa·s to thousands of mPa·s hardly affects the blobbing problem, but when the viscosity is 1000 mpa·s or less, blobbing decreases, and when it is 200 mPa·s or less, ink blobbing is remarkably reduced. Also with regard to the writing feeling, even if the viscosity decreases from millions of mPa·s to thousands of mPa·s, the writing feeling barely changes, but when it is 1000 mpa·s or less, the writing feeling is improved, and when it is 200 mPa·s or less, this improvement in writing feeling is remarkable.

A material having a high surface free energy referred to in the present invention is usually a material having a surface free energy of 50 to thousands erg/cm$^2$, and in general, this kind of material is easily wetted with the solvent used in the non-aqueous ink or the ink or the ink itself. Typical examples of the material having a high surface free energy include metals such as stainless steel, bronze and nickel silver, metal oxides, metal salts, and nonmetals such as glasses and ceramics.

In the ink according to the present invention, another resin and an adhesive can be used as needed, in addition to the coagulant and the resin as the dispersant. Furthermore, an anticorrosive agent, a lubricant, an antiseptic agent and the like can also be used. These materials are those which never impair the autolyophobic properties of the vehicle. In the case that the ink is prepared by adding the coagulant, the pigment and the like to this vehicle, it seems sometimes that the autolyophobic properties are apparently lost by the cohesive force of the coagulant, and for this reason, it is difficult to evaluate the lyophobic properties by measuring the contact angle of the ink. With regard to the ink of the present invention, when shearing stress is applied to the ink by the rotation of the ball, the cohesive force of the coagulant is weakened, so that the autolyophobic properties which the vehicle originally has can be exerted.

In the ink of the present invention, the vehicle preferably has autolyophobic properties to the surface of the material having a high surface free energy. The above-mentioned solvent itself preferably has autolyophobic properties, but when the solvent has no autolyophobic properties, this insufficiency can be supplemented by adding an oleophobic additive to the solvent. Fundamentally, it is ideal that the vehicle itself has the autolyophobic properties to the surface of the material having a high surface free energy.

The ink of the ball point pen of the present invention does not blob and provides for direct flow of ink. This allows a clean line to be drawn without transferring a mass of the ink at the start of writing. Additionally, the cap-off performance of the ink is excellent, and the ink allows a smooth writing feeling.

EXAMPLES

The present invention will be described in more detail with reference to examples and comparative examples.

Tests for evaluating inks were carried out as follows. Ball point pens used in the tests were each equipped with a polypropylene tube having an inner diameter of 2.0 mm and a stainless steel tip (a ball was made of a super hard alloy and had a diameter of 0.7 mm). Each ball point pen was filled with the respective inks described in the examples and comparative examples, and the following tests were then made.

Autolyophobic properties (Vehicle):

An ink or a vehicle was dropped on a stainless steel plate, and then observed by a microscope to measure a contact angle.

Autolyophobic properties (Ink):

An ink was dropped on a stainless steel plate on a desk, and the plate was then held vertically. The flow state of the ink drop was then observed.

○ . . . On a point at which the ink was dropped or along a portion over which the ink flowed, the ink was repelled, so that the place was not wetted (a state like the surface of a waxed car).

Δ . . . The ink was repelled, but not completely.

x . . . The point at which the ink was dropped or the portion over which the ink flowed was wetted with the ink (a state like a trace along which a slug has crawled).

Viscosity:

The viscosity was measured at 25° C.-50 rpm in Examples 1 to 5 and Comparative Examples 1 to 7, and at 15° C.-10 rpm in Examples 6 to 9 and Comparative Examples 8 to 11 by the use of an E type viscometer (EMD model and EHD model, made by Tokyo Keiki Co., Ltd.). Since the viscosity was high only in Comparative Example 5, the EHD model was used in Comparative Example 5.

Adhesive blobbing:

After a line of 100 m was written by a mechanical writing tester, the amount of the ink which adhered to the point of a tip was observed with the naked eye to evaluate the adhesive blobbing (an average of the results of the 10 ball point pens).

⊙ . . . Not adhered, ○ . . . Slightly adhered, ▽ . . . Relatively largely adhered, and x . . . Very largely adhered.

Drawn line blobbing:

The drawn line blobbing was evaluated on the basis of the number of ink drops on a paper during writing (an average of the results of the 10 ball point pens).

⊙ . . . 5 or less, ○ . . . 6 to 10, Δ . . . 10 to 30, and x . . . 30 or more.

Writing feeling:

The writing feeling was determined by freehand writing to evaluate the writing feeling.

Writing performance:

A spiral line was continuously written by freehand writing to observe a writing state.

Direct flow test:

The ball point pen was allowed to stand for 3 days in a thermo-humidistatic chamber at 25° C. and 65%, with the pen point facing downward, and the amount of the ink which adhered on the pen point was observed with the naked eye to evaluate a directed flow state.

Small amount of the adhered ink: ○>Δ>x: Large amount of the adhered ink.

Wear:

A mechanical writing test was carried out in a thermo-humidistatic chamber at 25° C. and 65% under a load of 200 g. The wear was evaluated by measuring a difference between the lengths of projecting balls before the writing and after the writing of 500 m.

Cap-off performance:

As a forced deterioration test, the ball point pen was allowed to stand under circumstances of 50° C. and 65% for one month, with its cap being removed, and a writing state was then observed to evaluate the cap-off performance.

○ . . . Good, Δ . . . Slight starving, and x . . . Unwritable.

Non-Newtonian viscosity index (n):

The values of viscosity ($\eta$) to viscometer rotation numbers (R) were measured by the use of an E type viscometer (EMD model and EHD model, made by Tokyo Keiki Co., Ltd.), and the values of the viscosity ($\eta$) were plotted along an ordinate axis and the viscometer rotation numbers (R) were plotted along an abscissa axis of a logarithmic graph. Then, the index (n) was determined from the gradient (n−1) of the depicted curve.

The components of compositions shown in Tables 1 and 2 used in the examples and the comparatives examples are as follows.

Colorants:
(1): A dye, "Barifast Black k#3830" (made by Orient Chemical Industry Co., Ltd.)
(2): Carbon black, "Printex #35" (made by Degussa)
(3): Azo Pigment #1010" (made by Fuji Dyestuff Co., Ltd.)
(4): "Barifast Violet #1701" (made by Orient Chemical Industry Co., Ltd.)
(5): "Barifast Yellow #1105" (made by Orient Chemical Industry Co., Ltd.)
(6): "Spiron Black CMHsp" (HODOGAYA CHEMICAL CO., LTD.)

Pigment dispersants:
Polyvinyl butyrals were used.
(1): "Eslec B BM-1" (made by Sekisui Chemical Co., Ltd.)
(2): "Eslec B BL-1" (made by Seikisui Chemical Co., Ltd.)

Resins:
(1): "PVP K-30" (made by GAF Co., Ltd.)
(2): "PVP K-90" (made by GAF Co., Ltd.)

Solvents:
Solvent (1): Ethylene glycol monophenyl ether (0.03 mmHg/20° C.)
Solvent (2): Polypropylene glycol (Molecular weight= 400) (0.02 mmHg/20° C. or less)
Solvent (3): Tripropylene glycol monobutyl ether (0.02 mmHg/20° C. or less)
Solvent (4): Diethylene glycol monomethyl ether (0.18 mmHg/25° C.)
Solvent (5): Benzyl alcohol (1 mmHg/58° C.)
Solvent (6): Triethylene glycol monobutyl ether (0.01 mmHg/20° C.)
Solvent (7): Ethylene glycol monomethyl ether (9.7 mmHg/25° C.)
Solvent (8): Triethylene glycol monomethyl ether (0.01 mmHg/20° C. or less) Solvent (9): Tripropylene glycol monomethyl ether Oleophobic additives:
(1) Perfluoroalkylphosphoric acid ester, "F-191" (made by DAINIPPON INK AND CHEMICALS, INC.)
(2) Alkylphosphoric acid ester, "RL-210" (made by Toho Chemical Industry Co., Ltd.)
(3) Oleic acid Coagulants:
(1) "Tarlen BA-600" (Kyoeisha Chemical Co., Ltd.)
(2) Lipophilic smectite, "SEN" (Cope Chemical Co., Ltd.)
(3) Lipophilic smectite, "SPN" (Cope Chemical Co., Ltd.)

EXAMPELS 1 TO 5, COMPARATIVE EXAMPLES 1 to 7

Inks for ball point pens were prepared in blend ratios (parts by weight) shown in Table 1. Tests were carried out by the use of ball point pens filled with these inks, and the results are shown in Table 1.

Comparative Example 1 is concerned with an example of a vehicle having a large n value, Comparative Example 2 is concerned with an example of a vehicle having a small n value, Comparative Example 3 is concerned with an example in which a solvent having a high vapor pressure is used, Comparative Example 4 is concerned with an example in which a vehicle having a contact angle of less than 5° is used, Comparative Examples 5 and 6 are concerned with examples of high viscosities and large n values, and Comparative Example 7 is concerned with an example in which the n value is 0.5 or less and the viscosity is 200 mPa·s or more, and in this example, the flow of the ink in a capillary which is an ink flow path is poor, so that ink flow decreases or cessation occurs.

EXAMPLES 6 TO 9, COMPARATIVE EXAMPLES 8 to 11

Inks for ball point pens were prepared in blend ratios (parts by weight) shown in Table 2. Tests were carried out by the use of ball point pens filled with these inks, and the results are shown in Table 1.

TABLE 1

|  | EXAMPLE | | | | |
| --- | --- | --- | --- | --- | --- |
|  | 1 | 2 | 3 | 4 | 5 |
| Colorant (1) |  | 5.0 |  |  |  |
| Colorant (2) | 6.0 |  | 6.0 |  | 6.0 |
| Colorant (3) |  |  |  | 4.0 |  |
| Colorant (4) |  |  |  |  |  |
| Colorant (5) |  |  |  |  |  |
| Dispersant (1) |  |  |  | 1.0 |  |
| Dispersant (2) | 1.0 |  | 1.0 |  | 1.0 |
| Resin (1) |  |  |  |  |  |
| Resin (2) |  |  |  |  |  |
| Solvent (1) |  | 57.7 |  |  |  |
| Solvent (2) | 10.0 | 10.0 |  |  |  |
| Solvent (3) |  |  |  | 10.0 |  |
| Solvent (4) | 80.9 |  |  | 83.2 |  |
| Solvent (5) |  | 19.3 |  |  |  |
| Solvent (6) |  |  | 89.7 |  |  |
| Solvent (7) |  |  |  |  |  |
| Solvent (8) |  |  |  |  | 90.8 |
| Oleophobic additive (1) | 0.1 |  | 0.3 | 0.2 |  |
| Oleophobic additive (2) |  |  |  | 0.1 | 0.2 |
| Oleophobic additive (3) |  |  |  |  |  |
| Coagulant (1) |  | 8.0 |  |  |  |
| Coagulant (2) | 2.0 |  |  | 1.5 | 2.0 |
| Coagulant (3) |  |  | 3.0 |  |  |
| Viscosity (mPa · s, 50 rpm) | 34 | 74 | 116 | 26 | 72 |
| Viscosity index (n) | 0.47 | 0.38 | 0.38 | 0.49 | 0.31 |
| Contact angle (vehicle) | 26° | 18° | 35° | 28° | 34° |
| Blobbing | ⊚ | ○ | ⊚ | ⊚ | ⊚ |
| Writing feeling | Light | Light | Light | Light | Light |
| Writing performance | Good | Good | Good | Good | Good |
| Direct flow | ○ | ○ | ○ | ○ | ○ |
| Cap-off performance | ○ | ○ | ○ | ○ | ○ |

|  | EXAMPLE | | | |
| --- | --- | --- | --- | --- |
|  | 1 | 2 | 3 | 4 |
| Colorant (1) |  | 3.0 |  |  |
| Colorant (2) | 6.0 |  | 6.0 | 6.0 |
| Colorant (3) |  |  |  |  |
| Colorant (4) |  |  |  |  |
| Colorant (5) |  |  |  |  |
| Dispersant (1) |  |  |  |  |
| Dispersant (2) | 1.0 |  |  | 1.0 |
| Resin (1) |  |  |  |  |
| Resin (2) |  |  |  |  |
| Solvent (1) |  |  |  |  |
| Solvent (2) |  |  | 10.0 | 10.0 |
| Solvent (3) |  |  |  |  |
| Solvent (4) |  | 92.9 |  |  |
| Solvent (5) |  |  |  |  |
| Solvent (6) | 90.0 |  |  |  |

TABLE 1-continued

|  |  |  |  |  |
| --- | --- | --- | --- | --- |
| Solvent (7) |  |  | 79.9 |  |
| Solvent (8) |  |  |  | 81.2 |
| Oleophobic additive (1) | 0.2 | 0.1 | 0.1 |  |
| Oleophobic additive (2) |  |  |  |  |
| Oleophobic additive (3) |  |  |  |  |
| Coagulant (1) |  |  |  |  |
| Coagulant (2) |  | 4.0 | 4.0 | 1.8 |
| Coagulant (3) | 2.8 |  |  |  |
| Viscosity (mPa · s, 50 rpm) | 59 | 168 | 18 | 52 |
| Viscosity index (n) | 0.58 | 0.19 | 0.49 | 0.45 |
| Contact angle (vehicle) | 35° | 35° | 25° | 5°> |
| Blobbing | ⊚ | — | ○ | x |
| Writing feeling | Light | — | Light | Light |
| Writing performance | Good | Bad | Good | Good |
| Direct flow | x | — | ○ | ○ |
| Cap-off performance | ○ | — | x | ○ |

|  | Comparative Example | | |
| --- | --- | --- | --- |
|  | 5 | 6 | 7 |
| Colorant (1) |  |  |  |
| Colorant (2) |  |  | 6.0 |
| Colorant (3) |  |  |  |
| Colorant (4) | 16.0 | 7.8 |  |
| Colorant (5) | 14.0 | 6.8 |  |
| Colorant (6) | 5.0 | 2.4 |  |
| Dispersant (1) |  |  |  |
| Dispersant (2) |  |  | 1.0 |
| Resin (1) | 8.0 | 10.2 |  |
| Resin (2) | 0.5 | 0.6 |  |
| Solvent (1) | 38.5 | 49.1 |  |
| Solvent (2) |  |  | 30.0 |
| Solvent (3) |  |  |  |
| Solvent (4) |  |  |  |
| Solvent (5) | 13.0 | 16.7 |  |
| Solvent (6) |  |  | 58.6 |
| Solvent (7) |  |  |  |
| Solvent (8) |  |  |  |
| Oleophobic additive (1) |  |  | 0.4 |
| Oleophobic additive (2) |  |  |  |
| Oleophobic additive (3) | 5.0 | 6.4 |  |
| Coagulant (1) |  |  |  |
| Coagulant (2) |  |  |  |
| Coagulant (3) |  |  | 4.0 |
| Viscosity (mPa · s, 50 rpm) | 10383 | 248 | 238 |
| Viscosity index (n) | 0.99 | 0.99 | 0.25 |
| Contact angle (vehicle) | 36° | 38° | 38° |
| Blobbing | Δ | x | — |
| Writing feeling | Heavy | Light | — |
| Writing performance | Good | Good | Bad |
| Direct flow | Δ | x | — |
| Cap-off performance | ○ | ○ | — |

TABLE 2

|  | EXAMPLE | | | |
| --- | --- | --- | --- | --- |
|  | 6 | 7 | 8 | 9 |
| Colorant (1) | 10.0 |  |  |  |
| Colorant (2) |  |  | 6.0 |  |
| Colorant (3) |  | 10.0 |  | 10.0 |
| Dispersant (1) |  | 3.0 |  | 3.0 |
| Dispersant (2) |  |  | 1.0 |  |
| Solvent (1) | 90.0 |  |  |  |
| Solvent (2) |  | 71.7 | 20.0 | 67.7 |
| Solvent (9) |  | 1.50 |  | 15.0 |
| Solvent (4) |  |  | 70.8 |  |
| Oleophobic additive (1) |  | 0.3 |  | 0.3 |
| Oleophobic additive (2) |  |  | 0.2 |  |
| Coagulant (1) |  |  | 2.0 | 4.0 |
| Viscosity (mPa·s) | 36 | 485 | 14 | 490 |
| Autolyophobic (ink) | ○ | ○ | Δ | Δ |
| Contact angle (vehicle) | 22° | 34° | 32° | 35° |
| Adhesive blobbing | ○ | ○ | ⊚ | ○ |

TABLE 2-continued

|  |  |  |  |  |
|---|---|---|---|---|
| Drawn line blobbing | ⊚ | ○ | ⊚ | ○ |
| Wear (μm) | 9 | 3 | 2 | 3 |
| Writing feeling | ○ | ○ | ○ | ○ |

|  | Comparative Example | | | |
|---|---|---|---|---|
|  | 8 | 9 | 10 | 11 |
| Colorant (1) | 10.0 | | | |
| Colorant (2) | | | | |
| Colorant (3) | | 10.0 | 10.0 | 10.0 |
| Dispersant (1) | | 3.0 | 3.0 | 3.0 |
| Dispersant (2) | | | 3.0 | 6.0 |
| Solvent (1) | | | | |
| Solvent (2) | | 72.0 | 68.7 | 65.7 |
| Solvent (3) | 90.0 | 15.0 | 15.0 | 15.0 |
| Solvent (4) | | | | |
| Oleophobic additive (1) | | | 0.3 | 0.3 |
| Oleophobic additive (2) | | | | |
| Coagulant (1) | | | | |
| Viscosity (mPa·s) | 11 | 480 | 1250 | 3780 |
| Autolyophobic (ink) | x | x | Δ | x |
| Contact angle (vehicle) | 5°> | 5°> | 32° | 5°> |
| Adhesive blobbing | x | x | Δ | Δ |
| Drawn line blobbing | x | x | Δ | x |
| Wear (μm) | 23 | 28 | 5 | 1 |
| Writing feeling | x | Δ | Δ | x |

Reference Example

An example of an aqueous ink having a middle viscosity is shown in Table 3.

TABLE 3

|  | Reference Example |
|---|---|
| Eosine | 4.5* |
| Acid Phloxine PB | 1.0* |
| Xanthane gum | 0.45* |
| Sodium benzoate | 1.0* |
| Glycerin | 10.0* |
| Ethylene glycol | 21.0* |
| Purified water | 62.05* |
| Viscosity (mPa·s, 50 rpm) | 119.3 |
| Viscosity index (n) | 0.28 |
| Contact angle (vehicle) | 5°> |
| Blobbing | Δ |
| Writing feeling | Light |
| Writing performance | Good |
| Direct flow | ○ |
| Cap-off performance | x |

*parts by weight

What is claimed is:

1. A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa·s (25° C., 50 rpm) or less which comprises an organic solvent having a vapor pressure of 0.2 mmHg (20° C.) or less, a colorant and a coagulant.

2. A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa·s (25° C., 50 rpm) or less which comprises (a) an autolyophobic vehicle which comprises an organic solvent having a vapor pressure of 0.2 mmHg (20° C.) or less and a pigment dispersant, (b) a coagulant and (c) a pigment, wherein said ink has a contact angle to the surface of said tip holder in the range of 5° to 40°.

3. The non-aqueous ball point pen of claim 2, wherein the autolyophobic vehicle further comprises an oleophobic additive.

4. A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa·s (25° C., 50 rpm) or less which comprises (a') an autolyophobic vehicle which comprises an organic solvent having a vapor pressure of 0.2 mmHg (20° C.) or less and a dye and (b) a coagulant, wherein said ink has a contact angle to the surface of said tip holder in the range of 5° to 40°.

5. The non-aqueous ball point pen of claim 4, wherein said autolyophobic vehicle further comprises an oleophobic additive.

6. A ball point pen which comprises a pen point comprising a ball and a tip holder, said tip holder having an inner and an outer surface, an ink reservoir, and a non-aqueous ink contained within said reservoir, wherein said outer surface of said tip holder comprises a material possessing a surface free energy of at least 50 erg/cm$^2$, which surface free energy is higher than that of said non-aqueous ink, wherein said non-aqueous ink possesses non-Newtonian autolyophobic properties in relation to said outer surface of said tip holder, and wherein said non-aqueous ink has a viscosity of 200 mPa·s (25° C., 50 rpm) or less.

* * * * *